Dec. 8, 1953  R. GORDON  2,661,853
FURNACE CHARGING APPARATUS
Filed Jan. 5, 1948  9 Sheets-Sheet 1
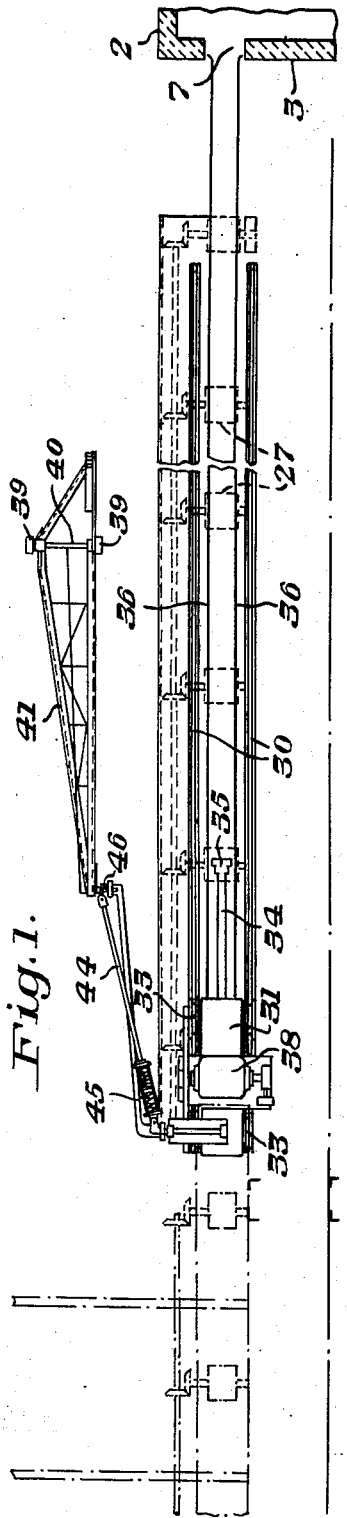
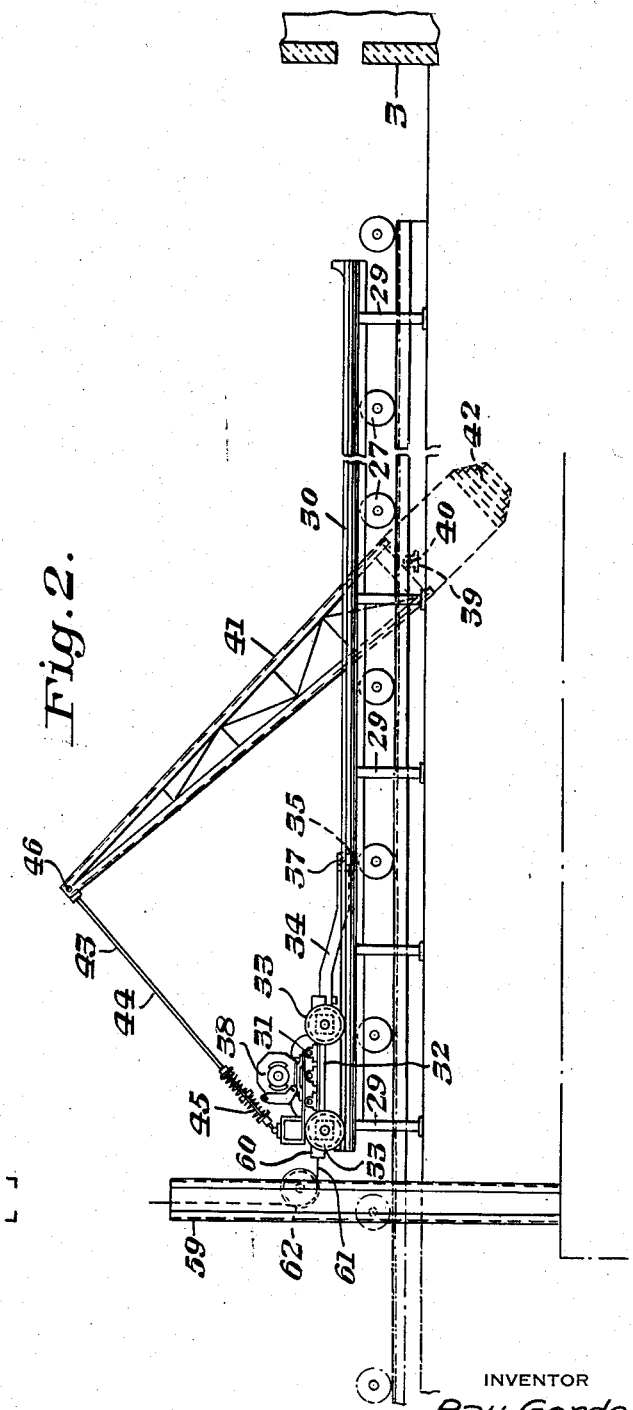
INVENTOR
*Ray Gordon*

Dec. 8, 1953  R. GORDON  2,661,853
FURNACE CHARGING APPARATUS
Filed Jan. 5, 1948  9 Sheets-Sheet 2
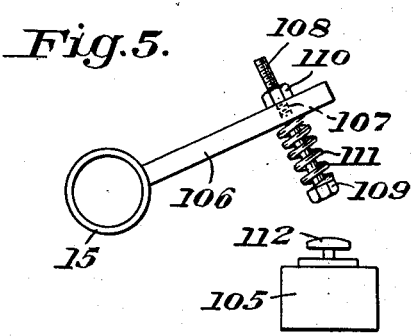
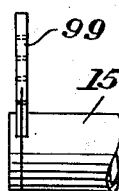
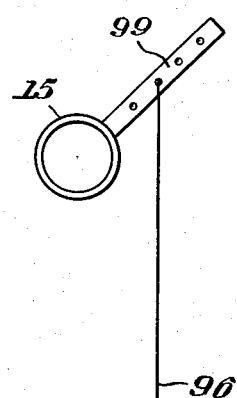
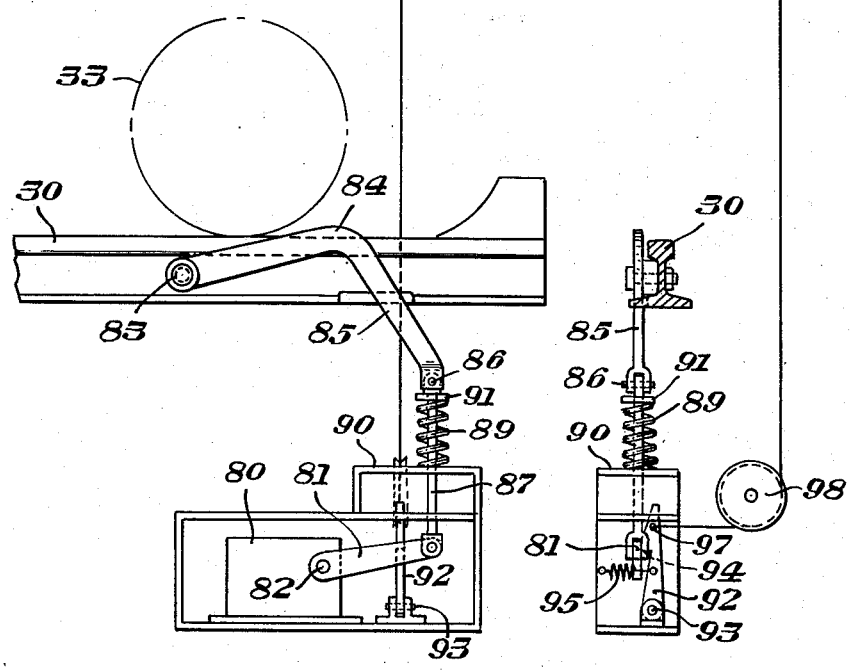
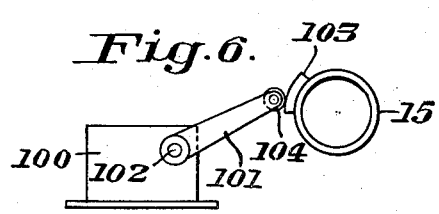
INVENTOR
Ray Gordon

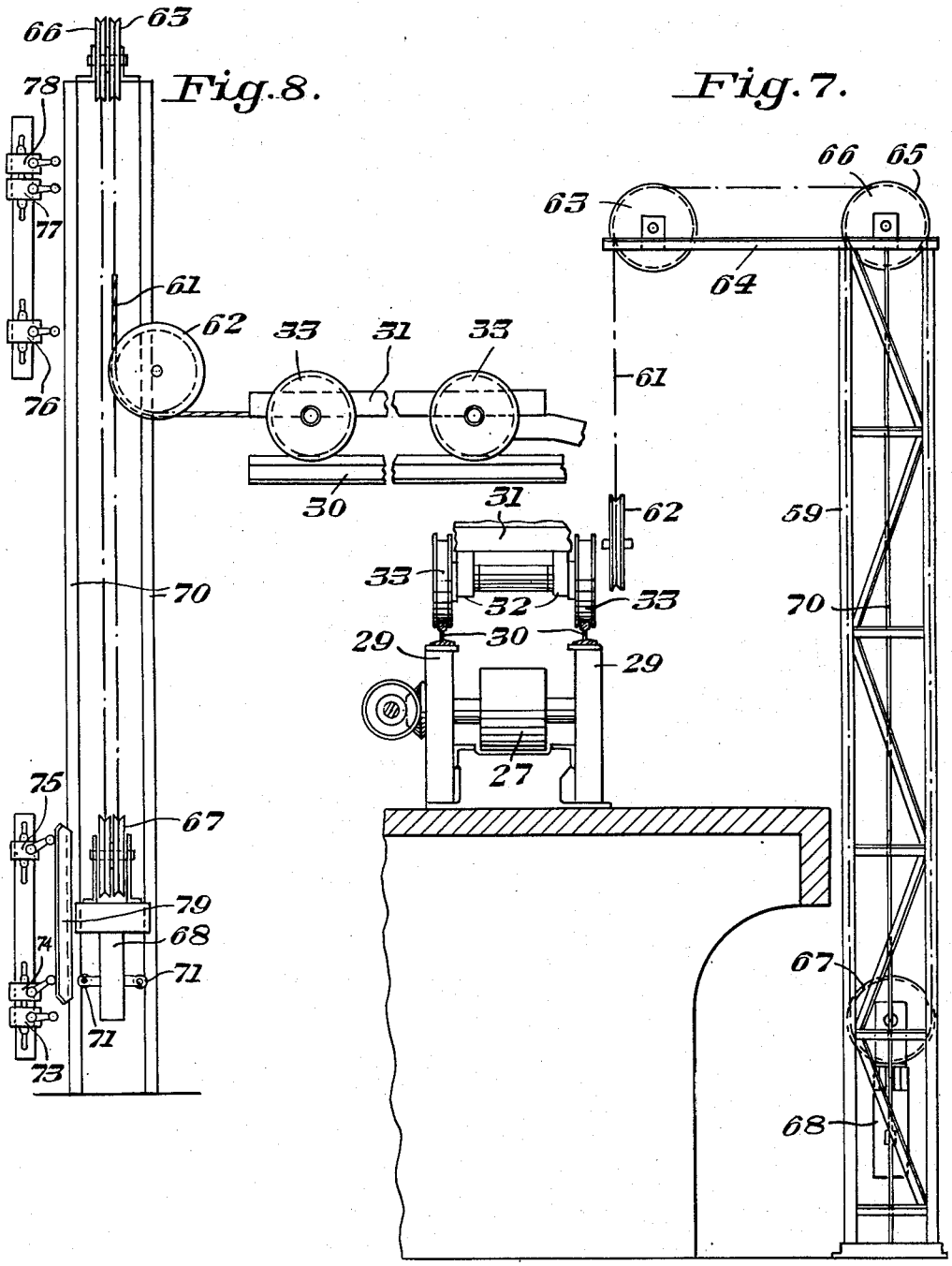

Dec. 8, 1953          R. GORDON          2,661,853
FURNACE CHARGING APPARATUS
Filed Jan. 5, 1948                                      9 Sheets-Sheet 4
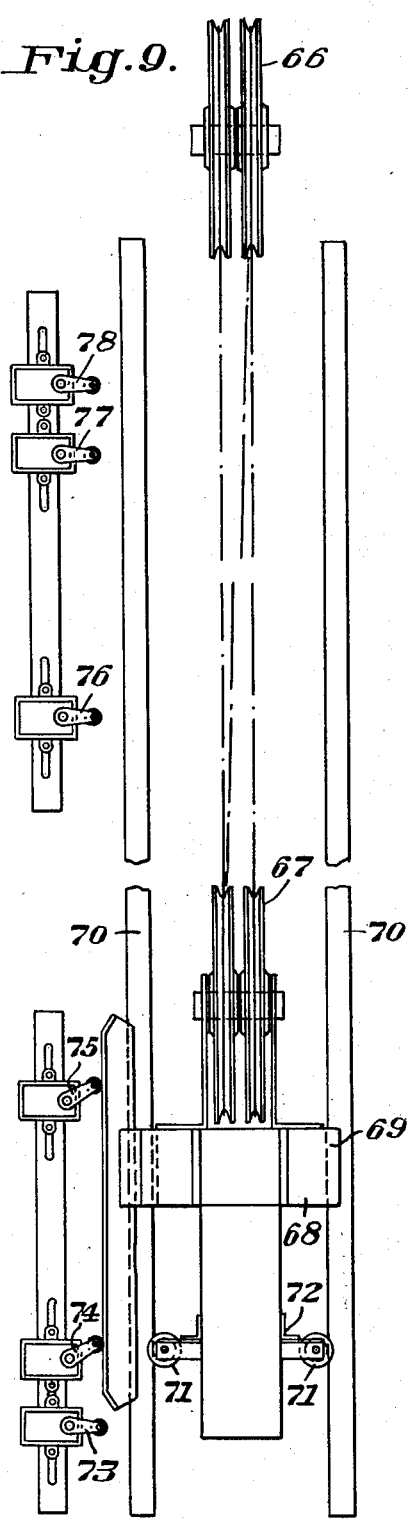
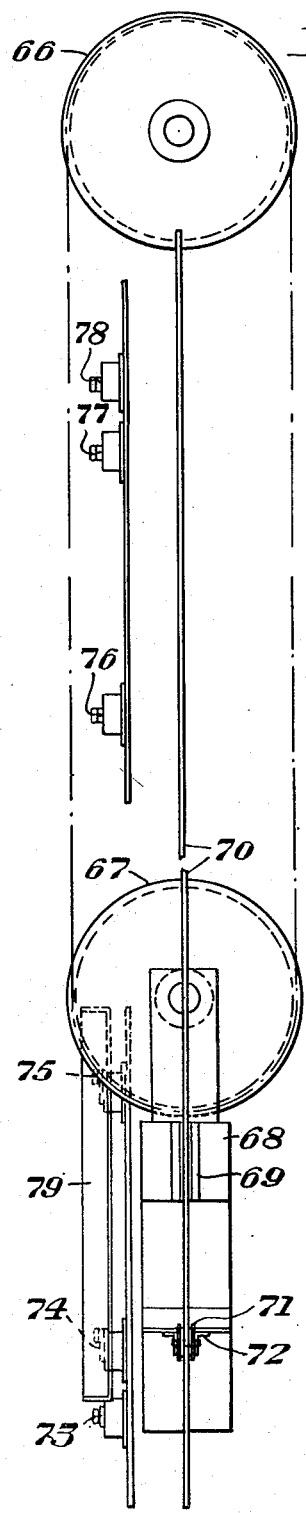
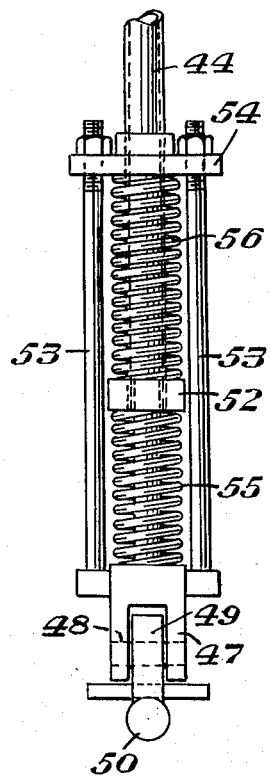
INVENTOR
Ray Gordon

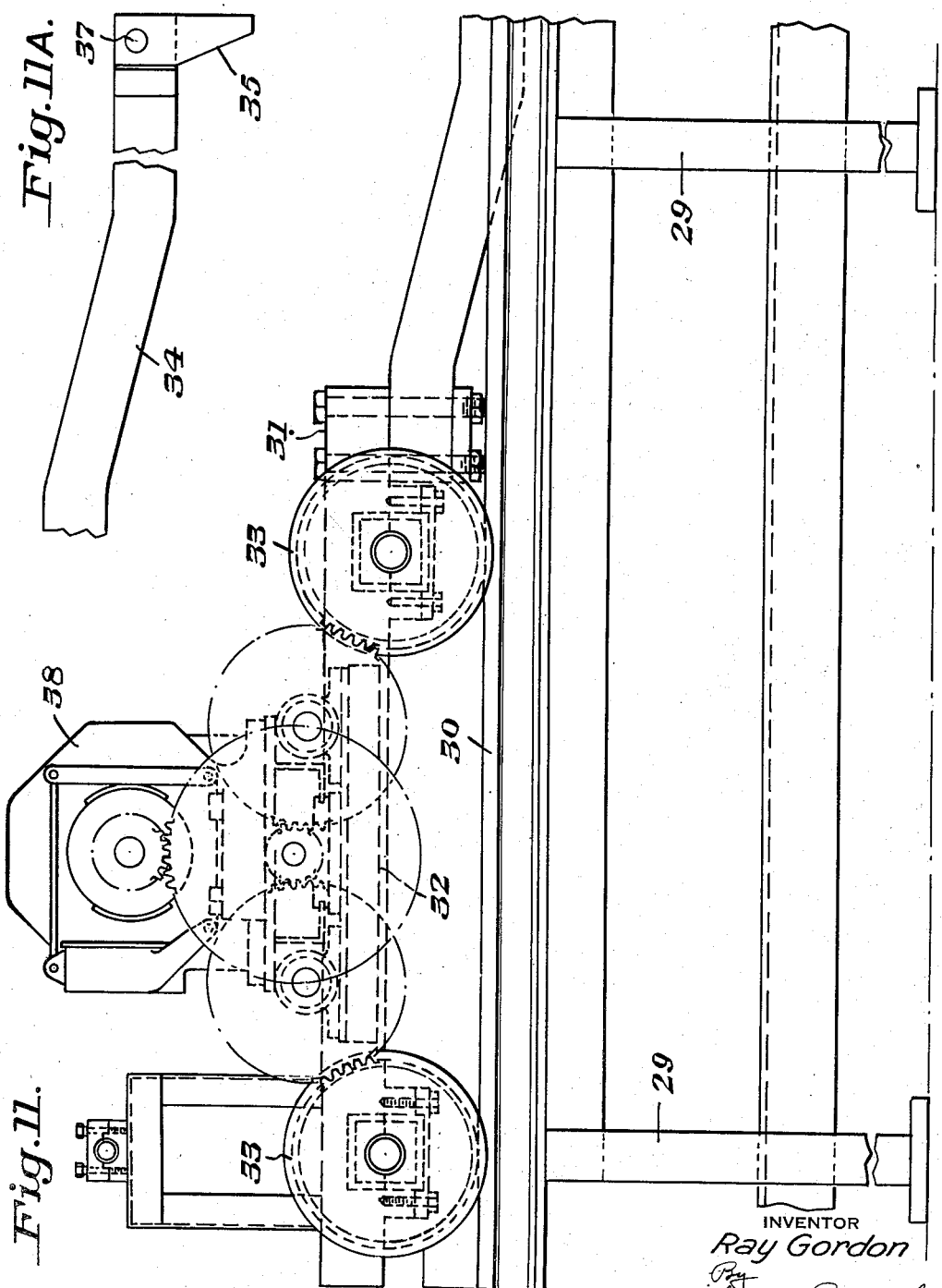

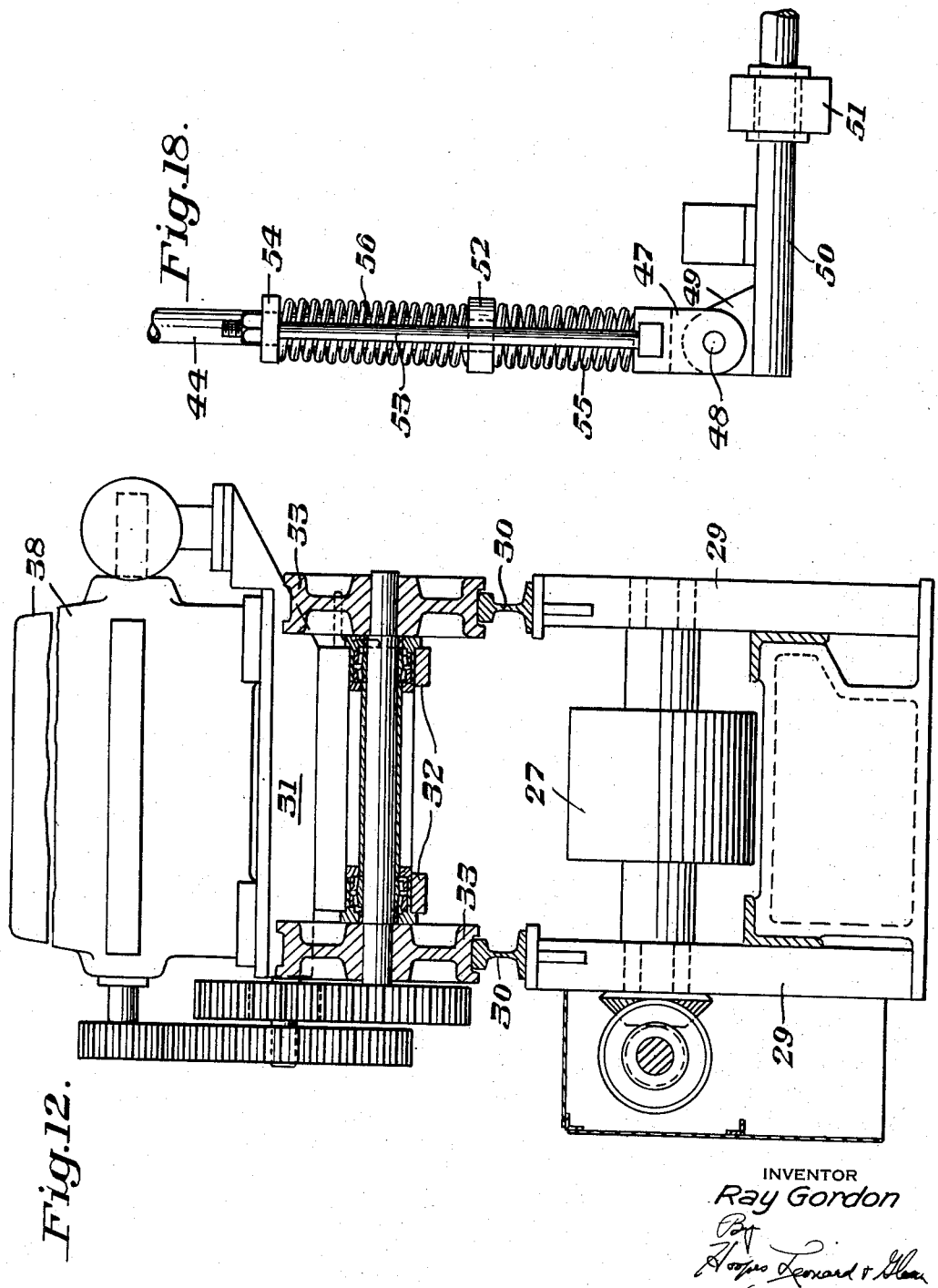

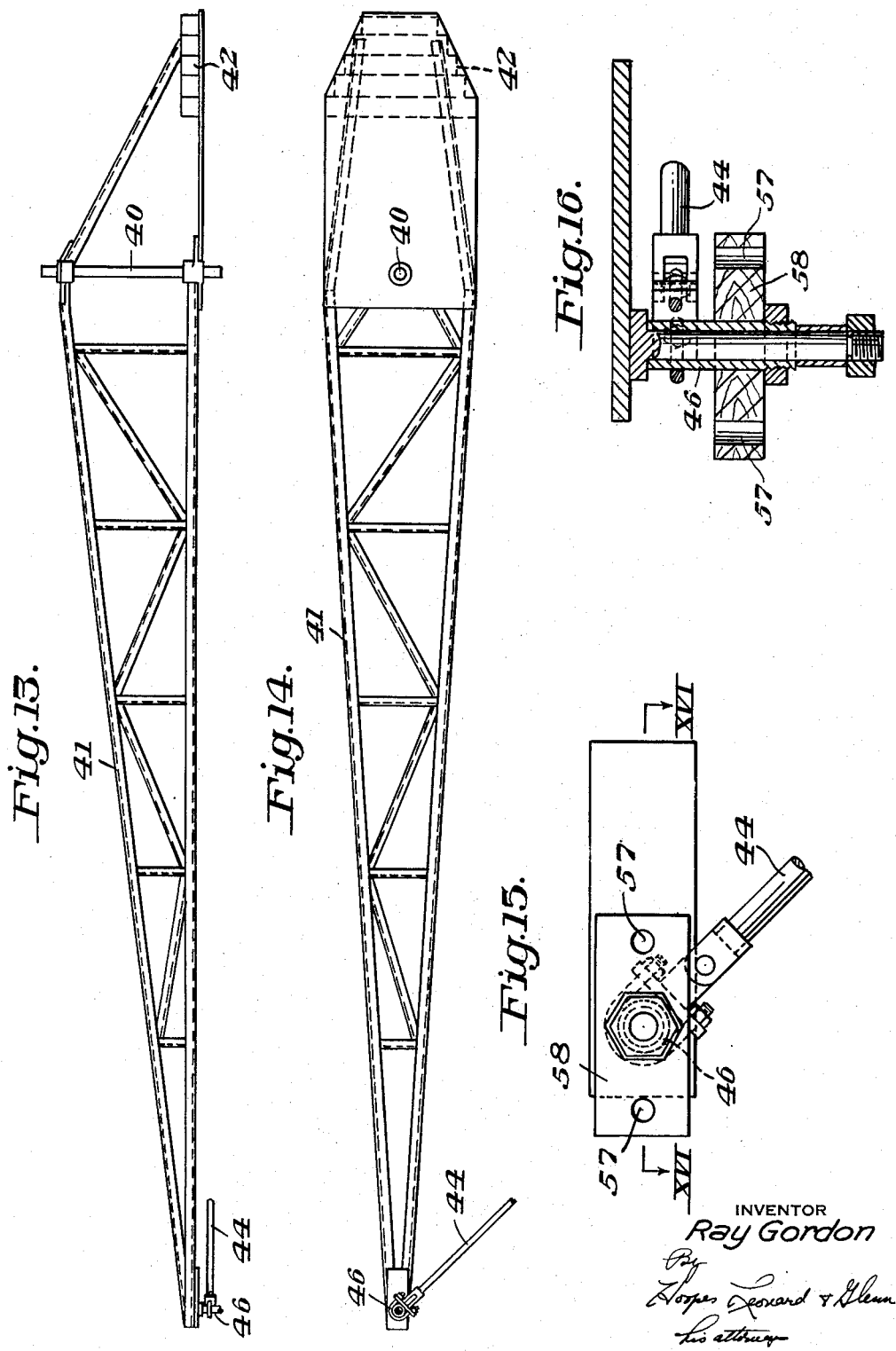

Dec. 8, 1953    R. GORDON    2,661,853
FURNACE CHARGING APPARATUS
Filed Jan. 5, 1948    9 Sheets-Sheet 8

INVENTOR
Ray Gordon

Dec. 8, 1953 R. GORDON 2,661,853
FURNACE CHARGING APPARATUS
Filed Jan. 5, 1948 9 Sheets-Sheet 9

INVENTOR
RAY GORDON

Patented Dec. 8, 1953

2,661,853

UNITED STATES PATENT OFFICE 2,661,853

FURNACE CHARGING APPARATUS

Ray Gordon, Struthers, Ohio

Application January 5, 1948, Serial No. 495

14 Claims. (Cl. 214—23)

This invention relates to furnace charging apparatus and to apparatus for moving work into and within a furnace. In certain of its more specific aspects it has to do with apparatus for charging work, e. g., billets and the like, into furnaces for heating the work prior to rolling or forging.

My invention provides apparatus for charging a furnace in a highly expeditious and efficient manner, the apparatus being relatively inexpensive yet at the same time performing its functions automatically and in a foolproof manner. The opportunities for human error are largely eliminated and the charging is preferably performed by a series of predetermined cyclic operations which are initiated by an operator and which upon being initiated proceed automatically to conclusion of the cycle.

While my invention is adaptable to apparatus for charging furnaces of various types, it has especial utility in connection with the charging of furnaces for heating shapes such as billets, slabs and the like, and for purposes of explanation and illustration the invention will be described as embodied in apparatus for charging a billet heating furnace.

The furnace per se may be of standard construction. For example, it may comprise a heating furnace heated by combustion or electric heating means into which billets are charged generally from a side of the furnace, the billets being moved longitudinally through the furnace while lying in side-by-side relationship, the direction of movement of the billets through the furnace being at right angles to their lengths. The billets may be charged into the furnace through a charging opening in a side wall of the furnace near one end. The billets may rest on skids while within the furnace, the skids desirably being inclined from the charging end to the discharging end of the furnace so that as the billets advance through the furnace they move somewhat downwardly along the skids.

Movement of the billets through the furnace may be effected by pushing means, which means may be disposed at the upper or charging end of the furnace and may operate cyclically to push downwardly billets which have been charged into the furnace through the charging opening. In one manner of operation the pushing means may push downwardly those billets which are in the furnace and may then be retracted, whereupon a new charge of billets may be introduced through the charging opening, the pushing means thereafter operating to push downwardly the new charge and in turn advance the previously charged billets.

The pushing means may be operated by any suitable source of power, as, for example, a steam cylinder operating to turn a shaft having radial arms to which the pusher elements are pivoted. The pusher shaft may be employed in the operation of control and/or signal means in conjunction with the charging apparatus and to that end may have means applied to it which perform functions in relation to the charging apparatus when the pusher is operated; aside from this the furnace and the means for moving the work through the furnace may be of known construction.

In the illustrated embodiment of the invention I provide means for charging billets into the furnace through a charging opening in a side wall of the furnace. The charging means are cyclically operable, introducing a charge of billets into the furnace and then being retracted ready for the next charging operation. The charging means are preferably automatically operated so that after a charge of billets has been introduced into the furnace the charging element automatically returns to the position which it occupies at the beginning of a charging cycle without any control or operation of it by the operator. Means are preferably provided insuring that the charging means cannot be operated when the pusher in the furnace is in advanced position. This insures against damage to the charging apparatus or the furnace mechanism by operation of the charging apparatus when the charging path into the furnace is obstructed by the pusher.

I also provide signal means showing the charging apparatus operator and the furnace operator when to operate their respective controls. When a charge of billets is charged into the furnace by the charging apparatus a red light is lighted, that light remaining lighted until the furnace operator has operated the pusher to push the charge down in the furnace. Operation of the pusher results in extinguishing of the red light. A white light is lighted when the furnace pusher is in retracted position ready for introduction of a charge of billets into the furnace but is extinguished when the pusher is in its forward position. Thus the red light serves as a signal to the furnace operator to operate the pusher while the white light serves as a signal to the charging apparatus operator to initiate a charging cycle of that appartus.

The charging apparatus may comprise a conveyor such, for example, as a roller table on which billets are adapted to be advanced toward the furnace and a cyclically operable charging element in the form of a pusher adapted to push into the furnace a charge of billets which has been advanced on the roller table to a predetermined position. The pusher is desirably automatically controlled so that when its operation is initiated by the operator to push a charge of billets into the furnace it will complete that operation and then return to its retracted position ready for a succeeding billet pushing operation all without any further control or operation whatever by the operator. The pusher may be connected with a carriage operable on tracks parallel to the roller table. The pusher preferably has a nose portion adapted to assume operative position when pushing billets into the furnace and adapted upon retraction of the pusher to ride up over the next charge of billets lying on the roller table. Thus when the carriage carrying the pusher advances toward the furnace to push a charge of billets into the furnace another charge of billets may be advanced behind the carriage on the roller table and when the carriage returns to its initial position the pusher head engages the second charge of billets and rides up over them until it reaches the end thereof remote from the furnace when it resumes operative position ready for the succeeding charging cycle.

The carriage may be operated by any suitable means. I find it convenient to operate the carriage by an electric motor which is mounted on the carriage itself. In order to transmit current to the electric motor mounted on the carriage I provide a mast pivoted about an axis transverse of the path of the carriage. An electrical conductor leads from a source of electric current to the mast in the region of the pivot and thence extends outwardly toward the end of the mast and thence extends to the motor on the carriage. As the carriage moves back and forth the mast swivels about its pivot. Desirably the mast is disposed to operate in a vertical plane and has its operative portion extending generally upwardly from the pivot. In such case the mast preferably has a relatively short portion extending generally downwardly from the pivot which is counterweighted so that the normal tendency of the mast is to assume generally upright position. The mast is preferably mounted about midway of the path of movement of the carriage so that when the carriage is at one end of its path the operative portion of the mast leans toward that end and when the carriage is at the other end of its path the operative portion of the mast leans toward that end.

A link is preferably pivoted to the mast adjacent its outer or upper end and to the carriage and the conductor preferably extends from the upper end of the mast generally along the link to the motor on the carriage. The link may comprise two telescoping portions which are resiliently mounted for limited telescoping movement to prevent binding and take up shocks upon quick starting or stopping of the carriage.

The movements of the carriage are preferably controlled by a series of switches which are operable in accordance with the position of the carriage in its path of movement. When the movement of the carriage in a charging cycle is initiated, the carriage preferably commences its movement slowly and after a short distance is speeded up, operating at the relatively high speed until near the end of its stroke adjacent to the furnace when it slows down and finally stops. It automatically moves back in the direction away from the furnace, starting up slowly and then operating at relatively high speed for most of its movement and finally slowing down near the end of its backward movement and ultimately stopping. The operator does nothing except initiate the cycle of movement of the carriage, the control system including the sequentially operated switches thereafter controlling the movement of the carriage.

The carriage controlling switches may be mounted in various different ways. I prefer to employ a traveler which travels consonantly with the carriage and to mount the switches along the path of the traveler. While the traveler may operate in a path oriented in any direction, I prefer to cause it to operate in a generally vertical path, whereas the carriage operates in a generally horizontal path. While the traveler operates consonantly with the carriage its amplitude of movement is preferably less than that of the carriage.

In the illustrated embodiment there is provided a tower mounted in vertical position adjacent the outer end of the path of movement of the carriage and a traveler movable up and down in the tower. The carriage controlling switches are mounted on the tower along the path of movement of the traveler. The traveler has a shoe which successively engages the switches in its movement up and down in the tower. The traveler is connected with the carriage by a flexible connector such as a cable which passes about sheaves which guide it from the carriage upwardly to the level of the top of the tower, thence laterally, and thence downwardly within the tower. Within the tower the traveler is preferably connected with the cable by a pulley system which reduces the amplitude of movement of the traveler relatively to the amplitude of movement of the carriage. The traveler is desirably counterweighted so that it maintains the cable taut and moves downwardly in the tower by gravity.

A control is provided so that if for any reason the movement of the carriage is interrupted during a cycle the carriage will automatically upon resumption of operation move away from the furnace to its original position or starting point. Movement of the carriage during its cycle may be interrupted by various causes, as, for example, power failure, opening of a circuit breaker due to overload, etc. If such an interruption of the movement of the carriage should occur while the carriage is moving toward the furnace the carriage will not continue its movement toward the furnace upon resumption of operation but will automatically move back to its original position or starting point.

Other details, objects and advantages of the invention will become apparent as the following description of a present preferred embodiment thereof proceeds.

In the accompanying drawings I have shown a present preferred embodiment of the invention, in which Figure 1 is a plan view, partly diagrammatic, of furnace charging apparatus;

Figure 2 is a longitudinal elevational view, partly diagrammatic, of the furnace charging apparatus shown in Figure 1;

Figure 3 is a diagrammatic fragmentary longitudinal elevational view to enlarged scale showing the red light switch and the means for operating it;

Figure 4 is a diagrammatic vertical transverse cross-sectional view of the mechanism shown in Figure 3;

Figure 5 is a diagrammatic elevational view showing the switch for the interlock preventing operation of the charging apparatus when the furnace pusher is in its forward position and the means for operating that switch;

Figure 6 is a diagrammatic elevational view showing the switch for operating the white light and the means for operating that switch;

Figure 7 is an elevational view, partly diagrammatic, looking longitudinally of the charging apparatus toward the furnace and showing the control tower;

Figure 8 is an elevational view, partly diagrammatic, of the structure shown in Figure 7 viewed at right angles to Figure 7;

Figure 9 is a fragmentary elevational view, partly diagrammatic, showing the traveler and the carriage control switches operated thereby;

Figure 10 is a view similar to Figure 9 of the apparatus shown in Figure 9 viewed at right angles to Figure 9;

Figure 19:
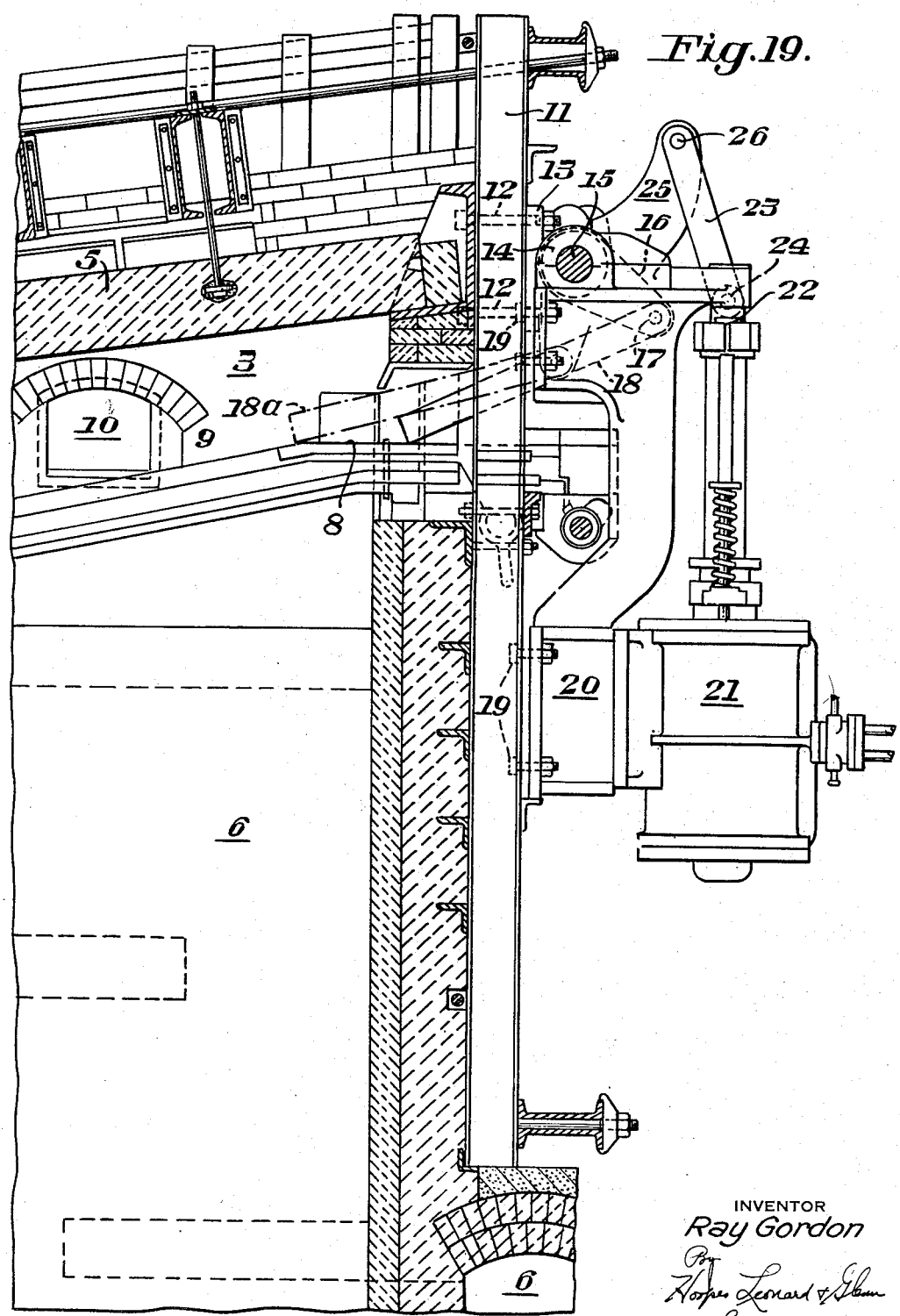
Figure 20:
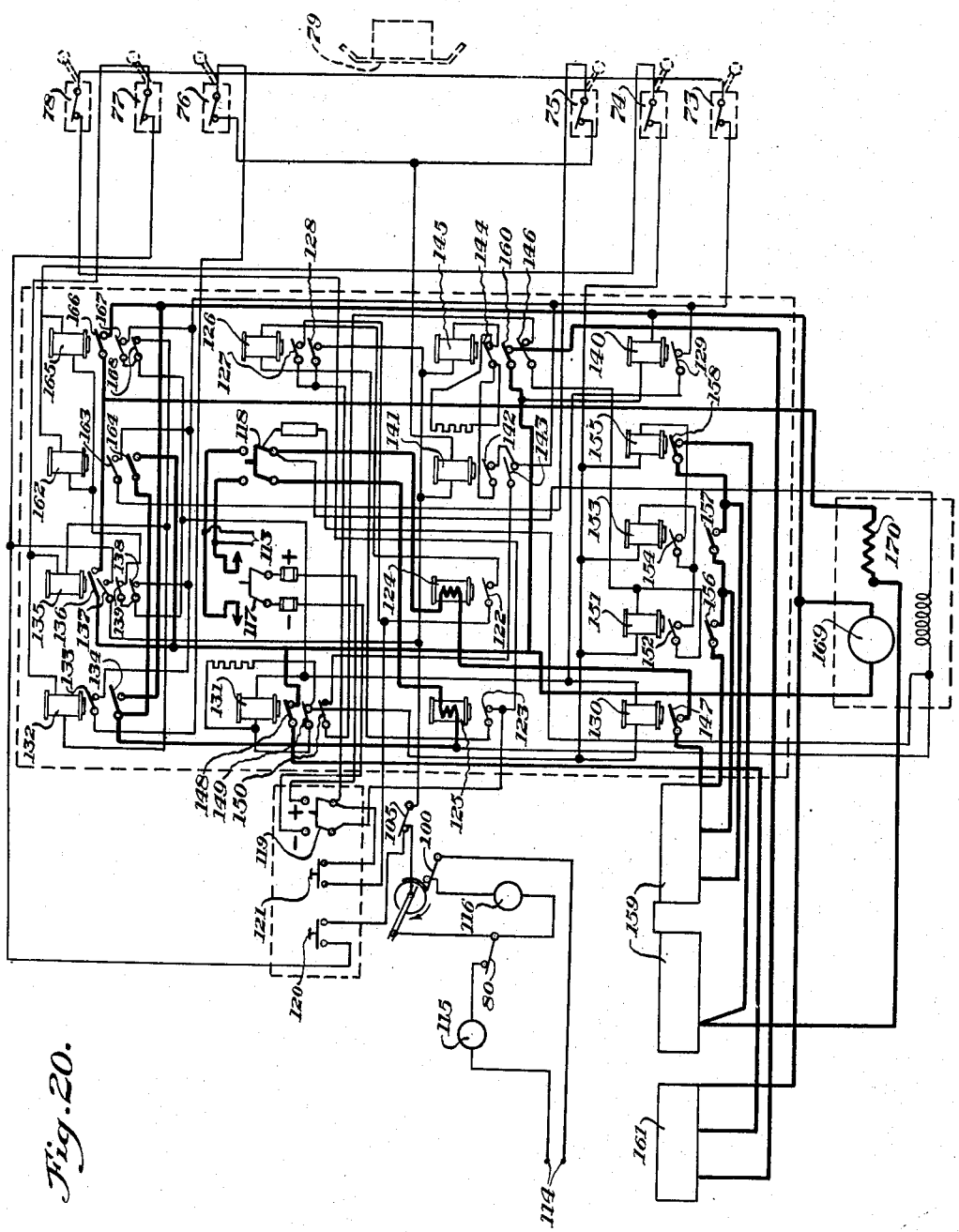

Figures 11 and 11A taken together constitute a side elevational view of the carriage of the charging apparatus and the billet pusher carried thereby and a portion of the underlying structure;

Figure 12 is a vertical transverse cross-sectional view of the mechanism shown in Figure 11;

Figure 13 is a side view of the conductor carrying mast;

Figure 14 is a side view of the mast shown in Figure 13 taken at right angles to Figure 13;

Figure 15 is a fragmentary detail view to enlarged scale of a portion of the structure shown in Figure 14;

Figure 16 is a fragmentary axial cross-sectional view through the structure shown in Figure 15;

Figure 17 is an enlarged fragmentary elevational view showing the telescopic connection of the portions of the link connecting the mast to the carriage;

Figure 18 is a view similar to Figure 17 of the apparatus shown in Figure 17 but taken at right angles to Figure 17;

Fig. 19 is a fragmentary vertical longitudinal cross-sectional view of a portion of the billet heating furnace; and Figure 20 is a wiring diagram showing the electrical system.

Referring now more particularly to the drawings and to Figure 19 thereof, there is shown a fragment of a billet heating furnace which may be of standard construction but in connection with which my invention is utilized. The furnace comprises a vertical end wall 2, opposed vertical side walls, one of which is designated 3, a bottom (not shown) and a roof 5. The furnace is of the combination heated type, heating gases passing through ducts 6 in known manner to heat billets charged into the furnace. Billets are charged into the furnace through a charging opening 7 in the wall 3. The charging opening 7 is near the top of the furnace. The billets entering the charging opening 7 rest upon skids 8. The skids 8 are arranged with their upper or billet supporting surfaces generally horizontal. The skids 8 communicate with inclined skids 9 which extend downwardly at an angle from the skids 8 and longitudinally of the furnace. The furnace is provided with inspection openings 10. The furnace has a discharge opening at its lower end through which the heated billets are removed from the furnace.

The furnace wall 2 comprises structural steel work 11 to which are connected by bolts 12 brackets 13 carrying bearings 14 in which is rotatably mounted a horizontal shaft 15 which extends crosswise of the furnace and which is the shaft for operating the means for moving the billets through the furnace. Fastened to the shaft 15 so as in effect to be integral therewith is a series of arms 16 spaced along the shaft. To each arm 16 is pivoted at 17 a pusher 18. Each pusher 18 passes through the furnace wall 2 through an opening provided for it therein and its forward end rests upon one of the skids 8. The shaft 15 is adapted to turn through an angle of ninety degrees or so to move the pushers 18 back and forth. In Figure 19 a pusher 18 extending from the pivot 17 is shown in retracted position while the forward end of the pusher in projected position is shown in chain lines at 18a. When the pushers are advanced from retracted to projected position by turning of the shaft 15 they push forward on the skids 8 billets which have been charged thereonto through the charging opening 7. The billets are pushed from the horizontal skids 8 onto the inclined skids 9 on which they advance downwardly longitudinally of the furnace.

Fastened to the steel work 11 by bolts 19 is a bracket 20 carrying a steam cylinder 21. A piston operates in the steam cylinder 21. A piston rod 22 is connected with the piston. A link 23 is pivoted to the piston rod 22 at 24. An arm 25 is fastened to the shaft 15 so as in effect to be integral therewith. The link 23 is pivoted to the arm 25 at 26.

When steam is admitted below the piston in the cylinder 21 the piston rises and through the piston rod 22, link 23 and arm 25 turns the shaft 15 in the counterclockwise direction, viewing Figure 19, thus retracting the pushers 18 to the position shown in Figure 19. When steam is admitted above the piston in the cylinder 21 the piston moves downwardly and the shaft 15 is turned in the clockwise direction, viewing Figure 19, to advance the pushers 18 to the position shown at 18a and push a charge of billets off of the skids 8 onto the skids 9.

The furnace mechanism thus far described does not per se constitute my invention, but my invention includes as one of its features certain interlocking or interconnecting controls between the shaft 15 and the charging apparatus. To this end there are applied to the shaft 15 certain control devices hereinafter described and which are additional to the normal furnace structure.

Referring now to Figures 1 to 18, inclusive, the furnace wall 3 is shown at the right in Figures 1 and 2, that wall having the charging opening 7 therein and joining the end wall 2 as shown in Figure 1. In alignment with the charging opening 7 is a roller conveyor 27 upon which billets are adapted to be advanced to and through the charging opening 7. The particular apparatus shown is intended for the charging of billets of the order of ten feet in length and longer. All of the rollers of the roller conveyor 27 may be driven or the first three or four rollers at the end of the conveyor nearer the furnace may be simply idler rollers.

Opposite the rear end of the roller conveyor 27 are a series of inclined loading skids 28 which extend generally downwardly to the conveyor and along which billets to be heated are adapted to be advanced. Depending upon the particular billets being heated one or more billets may constitute a charge and may be transferred from the skids 28 onto the roller conveyor 27 at a time. For example, three billets may constitute a charge and may be transferred from the skids 28 onto the roller conveyor 27 upon each cycle of operation of the charging apparatus.

At opposite sides of the roller conveyor 27 adjacent the right hand portion of the roller conveyor, viewing Figure 2, are columns 29 upon which are mounted rails 30 forming a track parallel to the conveyor and slightly above the top of the conveyor. Mounted upon the track for movement therealong is a carriage 31 having a body 32 carrying flanged wheels 33 riding upon the respective rails 30. Carried by the car and projecting forwardly therefrom is a peel or pusher 34 having a pusher head 35 which when in operative position projects downwardly until its lower surface just clears the rollers of the roller conveyor 27 so that the pusher is adapted to push along the conveyor billets lying thereupon. The billets are maintained in place on the rollers by side guides 36. The pusher head 35 is pivoted to the pusher body by a pivot pin 37 so that it is free to turn between its operative position as shown in Figures 2 and 11A through an angle approaching 90° in the counterclockwise direction about the axis of the pin 37 upon engagement with billets lying on the conveyor when the carriage 31 moves away from the furnace after pushing a charge of billets through the charging opening 7. When the pusher is pushing a charge of billets into the furnace another charge of billets may be advanced along the conveyor behind the carriage so that when the carriage moves rearwardly the pusher head 35 will ride up over those billets until it clears the rear ends thereof when due to gravity it will turn down to operative position ready to push the billets into the furnace.

The carriage 31 is operated by an electric motor 38 mounted thereon and which is connected through gearing with one or more of the wheels 33. The motor is a reversing motor so that by driving it in the desired direction it will move the carriage either forwardly or rearwardly.

Mounted in horizontal position in brackets 39 about midway of the path of the carriage along the track is a shaft 40 serving as a pivot for a mast 41. The mast 41 is mounted upon and adapted to turn about the axis of the shaft 40. The mast is built up of light weight structural steel and is normally adapted to be positioned with one end extending generally upwardly and the other end extending generally downwardly from the shaft 40. The upwardly extending end of the mast is relatively long and the downwardly extending end is relatively short. The downwardly extending end is weighted at 42 so that the normal tendency of the mast is to assume a generally vertical position with its longer end projecting upwardly. An electric conductor from a source of current passes to the mast in the region of the shaft 40 and thence outwardly along the mast and thence to the motor on the carriage 31. As the carriage 31 moves along the track the mast swivels back and forth about the axis of the shaft 40.

I prefer to employ a link between the upper end of the mast and the carriage. The link is designated generally by reference numeral 43 and comprises an upper hollow member or pipe 44 and a lower solid member or pin 45. The pipe 44 is pivoted to the top of the mast at 46. The pin 45 carries a yoke 47 pivoted at 48 to an ear 49 carried by a shaft 50 mounted in bearings 51 on the carriage. The pin 45 enters the lower end of the pipe 44. The collar 52 is fastened to the lower end of the pipe. A clevis 53 is connected with the yoke 47 and has a cross-piece 54 extending about the pipe. A compression coil spring 55 is biased between the yoke 47 and the collar 52 and another compression coil spring 56 is biased between the collar 52 and the cross-piece 54. Thus, considering the pin 45 to be stationary, when the pipe 44 tends to telescope downwardly over the pin it is allowed to partake of limited telescoping movement relatively to the pin, which movement is resiliently opposed and ultimately limited by the spring 55; and when the pipe 44 tends to move upwardly relatively to the pin 45 it is allowed to partake of limited telescoping movement relatively to the pin, which movement is resiliently opposed and ultimately limited by the spring 56. The link 43 is thus an extensible and contractable telescoping link and the springs absorb shock which would otherwise be imparted to the apparatus. The link 43 might be dispensed with entirely, but I fined its use generally preferable.

The electric conductors may be connected with the mast and carriage by any suitable connectors. For example, each of the two conductors may pass through a bore 57 in a block 58 carried by the pivot 46 and a similar block may be provided on the carriage. Such blocks may be of any nonconducting material such as wood, Bakelite or other plastic.

The movement of the carriage along the track is controlled by an electrical system shown in Figure 20 and comprising a series of switches. The switches are disposed so as to be sequentially operated consonantly with movement of the carriage. One form of control mechanism may include a control tower 59 disposed in vertical position at one side of the conveyor 27 a short distance to the rear of the rear end of the track 30. Connected with the carriage at 60 is a flexible connector shown as being in the form of a cable 61. The cable 61 passes about a sheave 62 stationarily mounted upon any suitable support and thence upwardly and over another sheave 63 carried by a projection 64 at the upper end of the tower 59. The cable thence passes over a sheave 65 forming one of a series of pulleys in a pulley system shown in Figures 9 and 10 in which the upper pulleys are designated generally by reference numeral 66 and the lower pulleys are designated generally by reference numeral 67. The upper pulleys are stationarily mounted at the top of the tower 59, the lower pulleys 67 being carried by a traveler 68 which is adapted to move up and down in the tower and which has guide members 69 cooperating with vertical guides 70 forming part of the tower. The traveler is also braced against the tower and maintained in proper orientation by rollers 71 carried by brackets 72 on the traveler. The traveler is of sufficient weight that it maintains the cable taut and thus in one sense it may be termed a counterweight.

As the carriage 31 moves along the track 30 from left to right, viewing Figure 2, the cable 61 pulls the traveler 68 upwardly in the tower. However, because of the pulley system the distance which the traveler moves upon an increment of movement of the carriage is only a fraction of the movement of the carriage. The pulley system may be designed to provide any desired relationship between the movement of the carriage and the movement of the traveler. The pulley system shown provides for movement of the traveler through a distance equal to one-fourth of the corresponding movement of the carriage. When the carriage moves back from right to left, viewing Figure 2, away from the furnace the traveler moves downwardly in the control tower through the action of gravity.

Mounted on the control tower along the path of the traveler are six switches designated respectively by reference numerals 73, 74, 75, 76, 77 and 78. The relationship of these switches to the remainder of the electrical system is shown in Figure 20 and will be presently described. For present purposes it may be explained that when the carriage 31 moves toward the furnace the traveler moves upwardly in the tower. As the carriage nears the furnace a tripper or shoe 79 on the traveler engages and operates the switch 76 with the result that the carriage slows down. The carriage proceeds at low speed until the shoe 79 engages and operates the switch 77, which stops the carriage. The switch 78 is an emergency stop switch which is engaged by the shoe 79 if the carriage has not been stopped by operation of the switch 77. Similarly, as the carriage moves away from the furnace it begins to move first at low speed and then moves at faster speed until the shoe 79 engages and operates the switch 75, which slows down the carriage. When the shoe 79 engages and operates the switch 74 the carriage stops. The switch 73 is an emergency stop switch to stop the carriage if it has not been stopped by operation of the switch 74.

A portion of the electrical system control is carried by the furnace pusher shaft 15 (see Figures 3, 4, 5 and 6). That portion of the control operates the interlock which prevents the carriage from being moved while the furnace pusher is advanced and also operates the red and white lights above referred to.

The red light switch is shown at 80 in Figure 3. It comprises an arm 81 pivotally mounted at 82. With reference to Figure 3, when the arm 81 is depressed or turned in the clockwise direction about the axis of the pin 82 the switch is closed to light the red light.

Pivoted to one of the rails 30 at 83 is a treadle 84 adapted to be engaged by a flange of one of the forward wheels 33 of the carriage 31 as the carriage nears the furnace. The treadle 84 has a generally downwardly extending arm 85 to which is pivoted at 86 a link 87 which in turn is pivoted at 88 to the switch arm 81. A compression coil spring 89 bears between a portion 90 of the switch carrying mechanism and a stop 91 disposed about the link 87 below the pivot 86. The spring 89 normally maintains the treadle 84 and the switch arm 81 in their upper positions when the red light is out. When the car wheel depresses the treadle 84 the switch arm 81 is depressed and the switch is closed to light the red light. A latch 92 is pivoted at 93 and has a hook 94 adapted when the switch arm 81 is depressed to be drawn by a spring 95 into engagement with that arm to hold the switch arm down and the switch closed until the latch is withdrawn. A flexible connector 96 is connected with the upper end of the latch at 97 and passes about a sheave 98 to an arm 99 carried by the furnace pusher shaft 15.

When the carriage 31 approaches the furnace the wheel depresses the treadle 84 and closes the switch 80, which is maintained closed by the latch 92 which is drawn into position to maintain the switch arm 81 downwardly by the tension coil spring 95. The red light is the signal to the furnace operator that a charge of cold billets has been introduced into the furnace through the charging opening 7. He operates the pusher shaft 15 to push those billets to the left, viewing Figure 19, as above described. The pusher shaft turns in the clockwise direction, viewing Figure 19, and in the counterclockwise direction, viewing Figure 4, when the billets are being pushed downwardly in the furnace. Turning of the shaft 15 causes the arm 99 to draw the connector 96 upwardly and about the sheave 98, which withdraws the latch 92 from latching engagement with the switch arm 81 and permits the spring 89 to open the switch 80. This extinguishes the red light. The red light remains out until on the succeeding cycle the carriage 31 again operates the treadle 84 when the series of operations described is repeated.

The white light switch is shown at 100 in Figure 6. It comprises a switch arm 101 pivoted at 102 and normally urged by a spring (not shown) to turn in the clockwise direction about the axis of the pivot 102, viewing Figure 6, to open the switch 100. Figure 6 is taken so that when the furnace pushers are operated the pusher shaft 15 turns in the counterclockwise direction, viewing that figure. The shaft 15 carries a cam 103 which when the furnace pushers are retracted operates the arm 101 to close the switch 100. When the furnace pushers are advanced and the shaft 15 turns in the counterclockwise direction, viewing Figure 6, the outer end 104 of the switch arm 101 rides down off of the cam 103 and the switch 100 opens. This extinguishes the white light. The switch 100 remains open until the shaft 15 turns back in the clockwise direction to the position in which the cam 103 raises the extremity 104 of the switch arm 101 to again close the switch 100. By this mechanism the white light is lighted when the furnace pushers are in their retracted position, i. e., in position so that the furnace is adapted to receive a new charge of billets. The charging machine operator uses the white light as his signal for charging billets into the furnace.

As will presently appear, the charging machine can only operate when a switch which interlocks the charging machine with the furnace pusher is closed. The interlocking switch is shown at 105 in Figure 5. The furnace pusher shaft 15 has rigidly connected thereto an arm 106 having a hole 107 drilled therethrough. Passing through the hole 107 is a bolt 108 having a head 109. A nut 110 is threaded onto the bolt at the face of the arm 106 opposite that at which the bolt head 109 is positioned, but the nut 110 is not drawn up tightly. Instead, a compression coil spring 111 is disposed between the bolt head 109 and the arm 106.

When the furnace pusher shaft 15 is in the position which it occupies when the pushers are retracted, the bolt head 109 is pressed downwardly against the operating element 112 of the switch 105 to maintain the switch 105 closed. This closes a master control circuit which makes it possible for the charging apparatus operator to operate the charging apparatus. However, when the furnace pusher is operated the shaft 15 turns in the counterclockwise direction, viewing Figure 5, and the operating element 112 of the switch 105 is released, being resiliently moved upwardly by a spring not shown which opens the switch 105 and makes it impossible to operate the charging apparatus until the pushers have returned to their retracted position.

The switches 100 and 105 are opened and closed at approximately the same time by operation of the shaft 15 and if desired those switches might be combined into one.

Referring now more particularly to Figure 20, there is provided a source of 220 volt direct current 113 and a source of 110 volt alternating current 114. The red light is shown at 115 and the white light at 116. There are provided three control switches 117, 118 and 119, all of which must be closed when the charging apparatus is to be put into use. The operator's control switch for initiating a cycle of operations of the control mechanism is shown at 120 and a reset switch is shown at 121.

When a cycle of operations of the carriage 31 is to be initiated the furnace pushers 18 are in retracted position, the white light 116 is lit and the interlock switch 105 is closed. Switches 122 and 123 on overload relays 124 and 125 respectively are normally closed. At the beginning of operation the reset switch 121 is operated, energizing coil 126 which closes switches 127 and 128 whereby to maintain the coil 126 energized upon opening of the reset switch 121. The coil 126 remains energized and the switches 127 and 128 hence remain closed so long as current flows through the circuit. The reset switch 121 need only be operated when the motor 38 has been stopped due to overload or when either of the switches 117 and 119 has been opened. All of the switches 73, 74, 75, 76, 77 and 78 are normally closed and are opened by contact of the tripper or shoe 79 therewith. As the carriage 31 is ready to start a cycle of movements, i. e., to move from its retracted position toward the furnace, the switches 74 and 75 are maintained in open position by the shoe 79, all of the other switches 73, 76, 77 and 78 being closed.

Switch 129 is normally closed, energizing coils 130 and 131. Energizing of coil 130 closes switch 147 and energizing of coil 131 opens switches 148 and 149 and closes switch 150. Operation of the control switch 120 by the operator energizes coil 132 which closes switches 133 and 134, and also energizes coil 135 which closes switches 136, 137 and 138 and opens switch 139. So long as switches 137 and 138 remain closed coils 132 and 135 remain energized. The motor 38 starts to turn in the forward direction, i. e., in the direction to move the carriage 31 toward the furnace, and the coil 140 is energized, opening the normally closed switch 129. The coils 130 and 131 are now maintained energized by the closed switch 138.

Current flows through closed switches 76 and 133 to energize coil 141 to close switches 142 and 143. The closing of switch 142 causes current to flow through normally closed switch 144 to energize coil 145 which closes switch 146 and opens switch 160. Since switches 143, 146 and 150 have been closed current flows through and energizes coil 151. This closes switch 152, energizing coil 153. This in turn closes switch 154 which energizes coil 155.

Energizing of coil 151 closes switch 156, energizing of coil 153 closes switch 157 and energizing of coil 155 closes switch 158, thus speeding up the motor in the forward direction. The motor has now been accelerated to full forward speed. As the carriage approaches the furnace the red light 115 is lighted as above explained. The shoe 79 engages and opens the switch 76, this in turn deenergizing coil 141 and opening the switch 143. Opening of the switch 143 deenergizes the coil 151, opening the switch 152 and in turn deenergizing the coil 153. Deenergizing of the coil 153 results in opening of the switch 154 and deenergizing of the coil 155. The result is that switches 156, 157 and 158 are opened, bringing in the starting resistance 159, resulting in slowing up of the motor. Deenergizing of the coil 141 also results in opening of the switch 142 and consequent deenergizing of coil 145. This results in closing of switches 144 and 160, applying armature shunt 161 and causing the motor to slow down.

As the shoe 79 engages the switch 77 that switch is opened, deenergizing coils 132 and 135. This results in deenergizing of coil 131 and closing of switch 148 and applying dynamic braking to the motor to bring it to a stop. Coil 130 is also deenergized, allowing switch 147 to open, disconnecting the motor from the source of current.

In case opening of the switch 77 for any reason fails to stop the motor continued movement of the carriage opens switch 78 which opens the control circuit and brings the motor to a quick stop. When the armature current in the motor drops to a predetermined point coil 140 is deenergized and switch 129 closes. This energizes coils 130 and 131. Switches 76 and 77 are now open while switches 73, 74, 75 and 78 are closed. Coils 162 and 165 are energized through switches 139 and 129. Energizing of coil 162 closes switches 163 and 164. Energizing of coil 165 closes switches 166 and 167 and opens switch 168. So long as switches 167 and 168 remain closed coils 162 and 165 remain energized. The motor 38 starts to turn in the reverse direction, i. e., in the direction to move the carriage 31 away from the furnace, and the coil 140 is energized, opening the normally closed switch 129. The coils 130 and 131 are now maintained energized by the closed switch 167.

Current flows through closed switches 75 and 163 to energize coil 141 to close switches 142 and 143. The closing of switch 142 causes current to flow through normally closed switch 144 to energize coil 145 which closes switch 146 and opens switch 160. Since switches 143, 146 and 150 have been closed current flows through and energizes coil 151. This closes switch 152, energizing coil 153. This in turn closes switch 154 which energizes coil 155.

Energizing of coil 151 closes switch 156, energizing of coil 153 closes switch 157 and energizing of coil 155 closes switch 158, thus speeding up the motor in the reverse direction. The motor has now been accelerated to full reverse speed. The shoe 79 engages and opens the switch 75, this in turn deenergizing coil 141 and opening the switch 143. Opening of the switch 143 deenergizes the coil 151, opening the switch 152 and in turn deenergizing the coil 153. Deenergizing of the coil 153 results in opening of the switch 154 and deenergizing of the coil 155. The result is that switches 156, 157 and 158 are opened, bringing in the starting resistance 159, resulting in slowing up of the motor. Deenergizing of the coil 141 also results in opening of the switch 142 and consequent deenergizing of coil 145. This results in closing of switches 144 and 160, applying armature shunt 161 and causing the motor to slow down.

As the shoe 79 engages the switch 74 that switch is opened, deenergizing coils 162 and 165. This results in deenergizing of coil 131 and closing of switch 148 and applying dynamic braking to the motor to bring it to a stop. Coil 130 is also deenergized, allowing switch 147 to open, disconnecting the motor from the source of current.

In case opening of the switch 74 for any reason fails to stop the motor continued movement of the carriage opens switch 73 which opens the control circuit and brings the motor to a quick stop. When the armature current in the motor drops to a predetermined point coil 140 is deenergized and switch 129 closes, thus setting up the apparatus for a succeeding cycle.

The motor operating circuit after the control switch 120 has been closed by the operator is as follows. Beginning at the lefthand side of the line at 113 the current flows through the lefthand side of the switch 118, the overload relay 125, the closed switch 134, the motor armature 169, the closed switch 136, the motor series field 170, the starting resistance 159, the closed switch 147, the overload relay 124 and the righthand side of the closed switch 118 to the righthand side of the line 113. As the carriage 31 moves toward the furnace the switchees 156, 157 and 158 close one after the other in that order. These switches successively cut out portions of the starting resistance 159 so that the motor speeds up to high speed.

The motor operating circuit after the carriage has stopped and begun to move in the reverse direction away from the furnace is as follows. Beginning at the lefthand side of the line at 113 the current flows through the lefthand side of the switch 118, the overload relay 125, the closed switch 164, the motor armature 169, the closed switch 166, the motor series field 170, the starting resistance 159, the closed switch 147, the overload relay 124 and the righthand side of the line 113. As the carriage 31 moves away from the furnace the switches 156, 157 and 158 close one after the other in that order. These switches successively cut out portions of the starting resistance 159 so that the motor speeds up to high speed.

If when the carriage 31 is moving toward the furnace a power failure occurs, switches 134 and 136 open. When power is resumed the switches 164 and 166 will be closed through the normally closed switch 129 with the result that the carriage will automatically move in the reverse direction away from the furnace to its starting point instead of resuming the forward motion of which it was partaking when the interruption occurred.

While I have shown and described a present preferred embodiment of the invention it is to be distinctly understood that the invention is not limited thereto but may be otherwise variously embodied within the scope of the following claims.

I claim:

1. Furnace charging apparatus comprising a work guideway, a carriage movable along the guideway and a generally horizontal pusher rigidly mounted on the carriage adapted to engage work disposed on the guideway and push the same therealong, the pusher having a pivoted work engaging nose which upon movement of the carriage in the direction opposite the direction in which the work is pushed is engaged by work disposed on the guideway and turned out of the plane of such work.

2. Furnace charging apparatus comprising a carriage movable toward and from a furnace opening, means carried by the carriage for engaging and moving toward the furnace work to be charged into the furnace, driving means for the carriage mounted on the carriage and control means separate from the carriage including means mounted for movement consonant with movement of the carriage and means mounted in the path of movement of said means and operable thereby for automatically controlling the driving means.

3. Furnace charging apparatus comprising a charging device movable toward and away from a furnace, driving means for thus moving the device and control means for controlling the driving means, the control means including a control element disposed in the path of a portion of the device actuatable by the device as it nears the furnace in its movement toward the furnace and connections between the control element and the driving means to reverse the direction of drive.

4. Furnace charging apparatus comprising a charging device movable toward and away from a furnace, driving means for thus moving the device, control means for controlling the driving means and manually operable means for initiating operation of the control and driving means, the control means including a control element disposed in the path of a portion of the device actuatable by the device as it nears the furnace in its movement toward the furnace to reverse the direction of drive so that the device automatically partakes of a cycle of movements toward and away from the furnace in response to a single operation of the manually operable means.

5. Furnace charging apparatus comprising a charging device movable toward and away from a furnace, driving means for the device carried by the device, control means for controlling the driving means and manually operable means for initiating operation of the control and driving means, the control means including a control element actuatable as the device nears the furnace in its movement toward the furnace to reverse the direction of drive so that the device automatically partakes of a cycle of movements toward and away from the furnace in response to a single operation of the manually operable means.

6. Furnace charging apparatus comprising a charging device movable toward and away from a furnace, driving means for thus moving the device, control means for controlling the driving means and manually operable means for initiating operation of the control and driving means, the control means including a control element disposed in the path of a portion of the device actuatable by the device as it nears the furnace in its movement toward the furnace to reverse the direction of drive and a control element actuatable as the device nears the end of its movement away from the furnace to render inoperative the driving means so that the device automatically partakes of one cycle only of movements toward and away from the furnace in response to a single operation of the manually operable means.

7. Furnace charging apparatus comprising a charging device movable generally horizontally toward and away from a furnace, driving means for thus moving the device, a traveler movable generally vertically consonantly with the device and control means operable by the traveler for controlling the driving means.

8. Furnace charging apparatus comprising a charging device movable generally horizontally toward and away from a furnace, driving means for thus moving the device, a traveler movable generally vertically consonantly with the device and control means including a series of switches successively operable by the traveler for controlling the driving means so that the device upon completing a movement toward the furnace reverses and moves away from the furnace and upon completing its movement away from the furnace is brought to a stop.

9. Furnace charging apparatus comprising a charging device movable generally horizontally toward and away from a furnace, driving means for thus moving the device, a traveler movable generally vertically consonantly with the device but whose movement is of less amplitude than the movement of the device and control means operable by the traveler for controlling the driving means.

10. Furnace charging apparatus comprising a charging device movable generally horizontally toward and away from a furnace, driving means for thus moving the device, a weight movable generally vertically, a flexible connector connecting the weight with the device so that the weight moves generally vertically consonantly with the generally horizontal movement of the device and means operable by the weight for controlling the driving means.

11. Furnace charging apparatus comprising a charging device movable generally horizontally toward and away from a furnace, driving means for thus moving the device, a tower, a weight movable generally vertically in the tower, means connecting the weight with the device so that the generally vertical movement of the weight in the tower is consonant with the generally horizontal movement of the device and means operable by the weight for controlling the driving means.

12. Furnace charging apparatus comprising a charging device movable generally horizontally toward and away from a furnace, driving means for thus moving the device, a tower, a weight movable generally vertically in the tower, means including a flexible connector and pulleys about which the flexible connector is reeved connecting the weight with the device so that the generally vertical movement of the weight in the tower is consonant with the generally horizontal movement of the device but of less amplitude and means operable by the weight for controlling the driving means.

13. Furnace charging apparatus comprising a charging device movable generally horizontally toward and away from a furnace, driving means for thus moving the device, a tower, a weight movable generally vertically in the tower, means including a flexible connector and pulleys about which the flexible connector is reeved connecting the weight with the device so that the generally vertical movement of the weight in the tower is consonant with the generally horizontal movement of the device but of less amplitude, a series of switches for controlling the driving means and means carried by the weight successively engaging and opening the switches upon generally vertical movement of the weight.

14. Furnace charging apparatus comprising a charging device movable generally horizontally toward and away from a furnace, driving means for thus moving the device, a tower, a weight movable generally vertically in the tower, means including a flexible connector and pulleys about which the flexible connector is reeved connecting the weight with the device so that the generally vertical movement of the weight in the tower is consonant with the generally horizontal movement of the device but of less amplitude, a series of switches for controlling the driving means and means carried by the weight successively engaging and operating the switches upon generally vertical movement of the weight so that the device upon completing a movement toward the furnace reverses and moves away from the furnace and upon completing its movement away from the furnace is brought to a stop.

RAY GORDON.

References Cited in the file of this patent

UNITED STATES PATENTS

| Number | Name | Date |
|---|---|---|
| 385,250 | Daniels | June 26, 1888 |
| 564,629 | Mather | July 28, 1896 |
| 586,809 | Dutton | July 20, 1897 |
| 606,159 | Boyd | June 21, 1898 |
| 668,050 | Peck | Feb. 12, 1901 |
| 704,286 | Allis | July 8, 1902 |
| 704,540 | Hill | July 15, 1902 |
| 789,767 | Snyder | May 16, 1905 |
| 868,639 | Brown | Oct. 22, 1907 |
| 887,805 | Higgins | May 19, 1908 |
| 1,003,344 | Cruikshank | Sept. 12, 1911 |
| 1,234,630 | Collord | July 24, 1917 |
| 1,595,139 | Blount | Aug. 10, 1926 |
| 1,687,501 | Liddiard | Oct. 16, 1928 |
| 1,797,348 | Kamerer | Mar. 24, 1931 |
| 1,880,374 | Dahlstrom | Oct. 4, 1932 |
| 1,891,531 | George | Dec. 20, 1932 |
| 2,151,338 | Shonnard | Mar. 21, 1939 |
| 2,166,404 | Hait | July 18, 1939 |
| 2,240,506 | Levesque et al. | May 6, 1941 |
| 2,397,339 | Crosby | Mar. 26, 1946 |
| 2,466,180 | Monroe | Apr. 5, 1949 |
| 2,469,269 | Lear | May 3, 1949 |